US010884100B2

(12) United States Patent
Altintas et al.

(10) Patent No.: US 10,884,100 B2
(45) Date of Patent: Jan. 5, 2021

(54) MULTI-CARRIER MODULATION ON FMCW RADAR FOR INTEGRATED AUTOMOTIVE RADAR AND COMMUNICATION SYSTEMS

(71) Applicant: TOYOTA JIDOSHA KABUSHIKI KAISHA, Toyota (JP)

(72) Inventors: Onur Altintas, Mountain View, CA (US); Chang-Heng Wang, Mountain View, CA (US)

( * ) Notice: Subject to any disclaimer, the term of this patent is extended or adjusted under 35 U.S.C. 154(b) by 218 days.

(21) Appl. No.: 16/204,764

(22) Filed: Nov. 29, 2018

(65) Prior Publication Data

US 2020/0174095 A1    Jun. 4, 2020

(51) Int. Cl.
| | |
|---|---|
| G01S 7/00 | (2006.01) |
| H04L 27/26 | (2006.01) |
| G01S 13/58 | (2006.01) |
| G01S 7/35 | (2006.01) |
| G01S 13/931 | (2020.01) |

(52) U.S. Cl.
CPC .............. G01S 7/006 (2013.01); G01S 7/352 (2013.01); G01S 13/584 (2013.01); G01S 13/931 (2013.01); H04L 27/2627 (2013.01); H04L 27/2697 (2013.01); G01S 2007/356 (2013.01)

(58) Field of Classification Search
CPC combination set(s) only.
See application file for complete search history.

(56) References Cited

U.S. PATENT DOCUMENTS

| | | | |
|---|---|---|---|
| 2003/0102997 A1* | 6/2003 | Levin | G01S 7/006 342/57 |
| 2018/0252802 A1* | 9/2018 | Tong | G01S 13/931 |
| 2019/0064344 A1* | 2/2019 | Turner | A61B 5/6898 |
| 2019/0178983 A1* | 6/2019 | Lin | H01Q 3/267 |
| 2019/0238379 A1* | 8/2019 | Walk | H04L 27/2627 |
| 2019/0370569 A1* | 12/2019 | Gulati | G01S 7/003 |

* cited by examiner

*Primary Examiner* — Mamadou L Diallo
(74) *Attorney, Agent, or Firm* — Burbage Law, P.C.; Jon-Michael Burbage; Elizabeth Ruzich

(57) ABSTRACT

The disclosure includes embodiments for performing integrated automotive radar processing and data communications. In some embodiments, a method for an integrated automotive radar and communication application includes generating a wireless signal. The method includes generating an automotive-radar waveform. The method includes combining the wireless signal with the automotive-radar waveform to generate a combination signal for the integrated automotive radar and communication application so that a radar bandwidth for the automotive-radar waveform is decoupled from a communication bandwidth for the wireless signal. The method includes transmitting the combination signal. The method includes listening for radar feedback associated with the combination signal. The method includes performing radar processing on the radar feedback to generate a radar detection result.

20 Claims, 15 Drawing Sheets

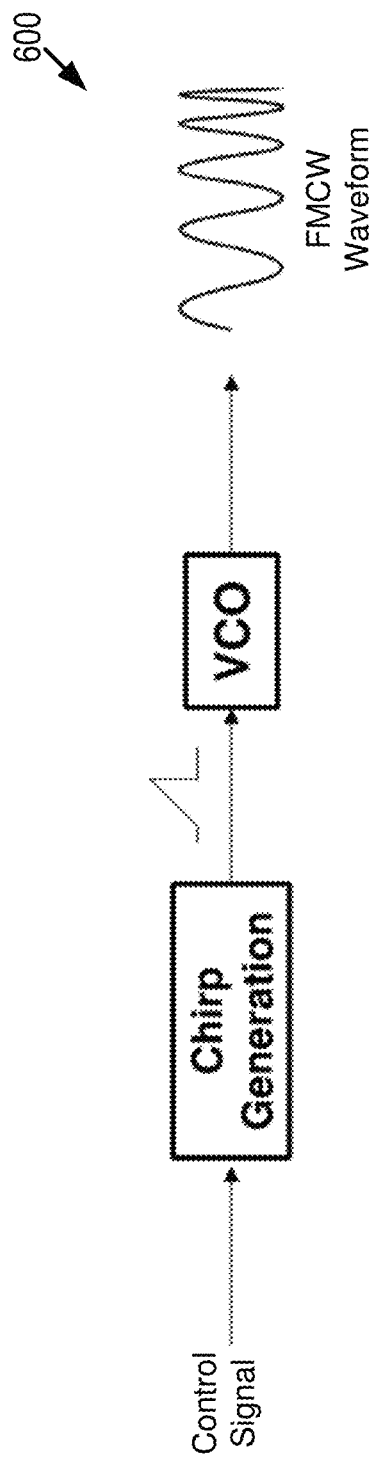

MULTI-CARRIER MODULATION ON FMCW RADAR FOR INTEGRATED AUTOMOTIVE RADAR AND COMMUNICATION SYSTEMS

BACKGROUND

The specification relates to applying Orthogonal Frequency-Division Multiplexing (OFDM) signals and Frequency-Modulated Continuous-Wave (FMCW) waveforms for integrated radar and communication applications in vehicles.

Vehicles are expected to exchange an increasing amount of data with one another for various vehicular applications via Vehicle-to-Everything (V2X) communications. For example, vehicles may generate a large volume of sensor data and share the sensor data with one another via any form of V2X communications so that driving safety of the vehicles can be improved by the vehicles using this sensor data as inputs to onboard safety systems. However, the bandwidth allocated for V2X communications is limited, thereby creating a limitation on how much sensor data can be shared among vehicles using V2X communications.

Automotive radar uses a spectrum of bandwidth (e.g., between 76 gigahertz (GHz) and 81 GHz) that is dedicated and allocated for radar measurement. Dual use of this spectrum for both data communications and radar functionality has been discussed for some years. An example of the dual use of this spectrum includes employing an integrated radar and communication technique in vehicular applications. In the integrated radar and communication technique, vehicles use the same waveform for both radar and communication purposes.

For example, as shown in FIG. 1A, an integrated radar communication device 170 transmits a waveform which carries information to another integrated radar communication device 171. The other integrated radar communication device 171 decodes the information from the received waveform. Meanwhile, the waveform is reflected by the other integrated radar communication device 171 and any other objects 172, such that the integrated radar communication device 170 receives radar feedback associated with the waveform and then performs radar processing on the radar feedback.

Also, this integrated radar and communication technique is more secure than omni-directional methods of wireless communications. For example, in some embodiments this integrated radar and communications technique is more secure because it only transmits in a limited number of directions (it is "highly directional"), and this renders the wireless messages transmitted by this technique to be less likely to be intercepted or overheard relative to omnidirectional transmissions which have more opportunity to be intercepted or overheard because they are transmitted all directions.

There are no current solutions that provide a solution for dual use of this spectrum for both data communications and radar functionality in automobile applications.

SUMMARY

Described are embodiments of a signal module that is capable of modifying an OFDM signal so that the modified OFDM signal includes a Frequency-Modulated Continuous-Wave (FMCW) waveform instead of an OFDM waveform, which beneficially makes the OFDM signal more suitable for joint radar and communication applications in automobiles. The FMCW waveform has a larger bandwidth and lower peak-to-average power ratio (PAPR) than standard OFDM waveforms, and this larger bandwidth and lower PAPR are correlated with various radar and communication improvements that are described herein. In some embodiments, the modified OFDM signal is transmitted and received in the spectrum of bandwidth allocated for automobile applications (between 76 GHz and 81 GHz).

In some embodiments, the signal module is installed in an onboard unit of a connected vehicle (i.e., a signal system of the vehicle). The signal system includes: (1) a communication subsystem having a receiver and a transmitter for receiving and transmitting OFDM signals or any other suitable types of signals (for both communication and radar purposes); (2) a radar system; and (3) a signal module.

The signal module includes code and routines that are operable to cause a processor of the onboard unit to execute one or more of the following operations: (1) generating an OFDM baseband signal; (2) generating an FMCW waveform; (3) modulating the FMCW waveform with the OFDM baseband signal to generate a combination signal (i.e., an OFDM signal that includes a FMCW waveform); (4) transmitting the combination signal using the transmitter; (5) listening for radar feedback using the receiver or the radar system; (6) receiving the radar feedback; and (7) processing the radar feedback to identify radar information (e.g., radar information about a recipient of the combination signal or radar information of another object that reflects the combination signal).

A system of one or more computers can be configured to perform particular operations or actions by virtue of having software, firmware, hardware, or a combination of them installed on the system that in operation causes the system to perform the actions. One or more computer programs can be configured to perform particular operations or actions by virtue of including instructions that, when executed by data processing apparatus, cause the apparatus to perform the actions.

One general aspect includes a method for an integrated automotive radar and communication application, including: generating a wireless signal; generating an automotive-radar waveform; combining the wireless signal with the automotive-radar waveform to generate a combination signal for the integrated automotive radar and communication application so that a radar bandwidth for the automotive-radar waveform is decoupled from a communication bandwidth for the wireless signal; transmitting the combination signal; listening for radar feedback associated with the combination signal; and performing radar processing on the radar feedback to generate a radar detection result. Other embodiments of this aspect include corresponding computer systems, apparatus, and computer programs recorded on one or more computer storage devices, each configured to perform the actions of the methods.

Implementations may include one or more of the following features. The method where the wireless signal includes an OFDM baseband signal, the automotive-radar waveform includes an FMCW waveform, and the combination signal includes an OFDM signal that includes a multi-carrier modulated FMCW waveform. The method where the FMCW waveform has a larger bandwidth and a lower peak to average power ratio than a standard OFDM waveform. The method where the radar bandwidth is increased without a need to increase the communication bandwidth. The method where combining the wireless signal with the automotive-radar waveform to generate the combination signal includes: modulating the automotive-radar waveform with the wireless signal to generate the combination signal. The method where performing radar processing on the radar feedback to generate the radar detection result includes: processing the radar feedback to identify radar information about a recipient of the combination signal. The method where the radar information includes range information and velocity information. The method where performing radar processing on the radar feedback to generate the radar detection result includes: performing range processing on the radar feedback to generate a preliminary range result; using a multi-carrier modulation to construct a matched filter to restore a beat frequency from the preliminary range result; determining range information based on the beat frequency; and performing velocity processing on the radar feedback to determine velocity information. The method where the radar detection result includes the range information and the velocity information. The method where the range processing and the velocity processing are performed together using a two dimensional fast Fourier transform (2D-FFT) on the radar feedback so that the preliminary range result and the velocity information are generated, where a first dimensional FFT of the 2D-FFT corresponds to the range processing and a second dimensional FFT of the 2D-FFT corresponds to the velocity processing. Implementations of the described techniques may include hardware, a method or process, or computer software on a computer-accessible medium.

One general aspect includes a system including a processor and a non-transitory memory storing computer code which, when executed by the processor, causes the processor to: generate a wireless signal; generate an automotive-radar waveform; combine the wireless signal with the automotive-radar waveform to generate a combination signal for an integrated automotive radar and communication application so that a radar bandwidth for the automotive-radar waveform is decoupled from a communication bandwidth for the wireless signal; transmit the combination signal; listen for radar feedback associated with the combination signal; and perform radar processing on the radar feedback to generate a radar detection result. Other embodiments of this aspect include corresponding computer systems, apparatus, and computer programs recorded on one or more computer storage devices, each configured to perform the actions of the methods.

Implementations may include one or more of the following features. The system where the wireless signal includes an OFDM baseband signal, the automotive-radar waveform includes an FMCW waveform, and the combination signal includes an OFDM signal that includes a multi-carrier modulated FMCW waveform. The system where the FMCW waveform has a larger bandwidth and a lower peak to average power ratio than a standard OFDM waveform. The system where the radar bandwidth is increased without a need to increase the communication bandwidth. The system where the computer code, when executed by the processor, causes the processor to combine the wireless signal with the automotive-radar waveform to generate the combination signal at least by: modulating the automotive-radar waveform with the wireless signal to generate the combination signal. The system where the computer code, when executed by the processor, causes the processor to perform radar processing on the radar feedback at least by: processing the radar feedback to identify radar information about a recipient of the combination signal. The system where the radar information includes range information and velocity information. The system where the computer code, when executed by the processor, causes the processor to perform radar processing on the radar feedback at least by: performing range processing on the radar feedback to generate a preliminary range result; using a multi-carrier modulation to construct a matched filter to restore a beat frequency from the preliminary range result; determining range information based on the beat frequency; and performing velocity processing on the radar feedback to determine velocity information. The system where the radar detection result includes the range information and the velocity information. The system where the range processing and the velocity processing are performed together using a 2D-FFT on the radar feedback so that the preliminary range result and the velocity information are generated, where a first dimensional FFT of the 2D-FFT corresponds to the range processing and a second dimensional FFT of the 2D-FFT corresponds to the velocity processing. Implementations of the described techniques may include hardware, a method or process, or computer software on a computer-accessible medium.

One general aspect includes a computer program product including a non-transitory memory storing computer-executable code that, when executed by a processor, causes the processor to: generate a wireless signal; generate an automotive-radar waveform; combine the wireless signal with the automotive-radar waveform to generate a combination signal for an integrated automotive radar and communication application so that a radar bandwidth for the automotive-radar waveform is decoupled from a communication bandwidth for the wireless signal; transmit the combination signal; listen for radar feedback associated with the combination signal; and perform radar processing on the radar feedback to generate a radar detection result. Other embodiments of this aspect include corresponding computer systems, apparatus, and computer programs recorded on one or more computer storage devices, each configured to perform the actions of the methods.

Implementations may include one or more of the following features. The computer program product where the wireless signal includes an OFDM baseband signal, the automotive-radar waveform includes an FMCW waveform, and the combination signal includes an OFDM signal that includes a multi-carrier modulated FMCW waveform. The computer program product where the FMCW waveform has a larger bandwidth and a lower peak to average power ratio than a standard OFDM waveform. The computer program product where the radar bandwidth is increased without a need to increase the communication bandwidth. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

FIG. 6A depicts a block diagram illustrating generation of an automotive-radar waveform (e.g., an FMCW waveform) according to some embodiments.

DETAILED DESCRIPTION

Figure 1A:
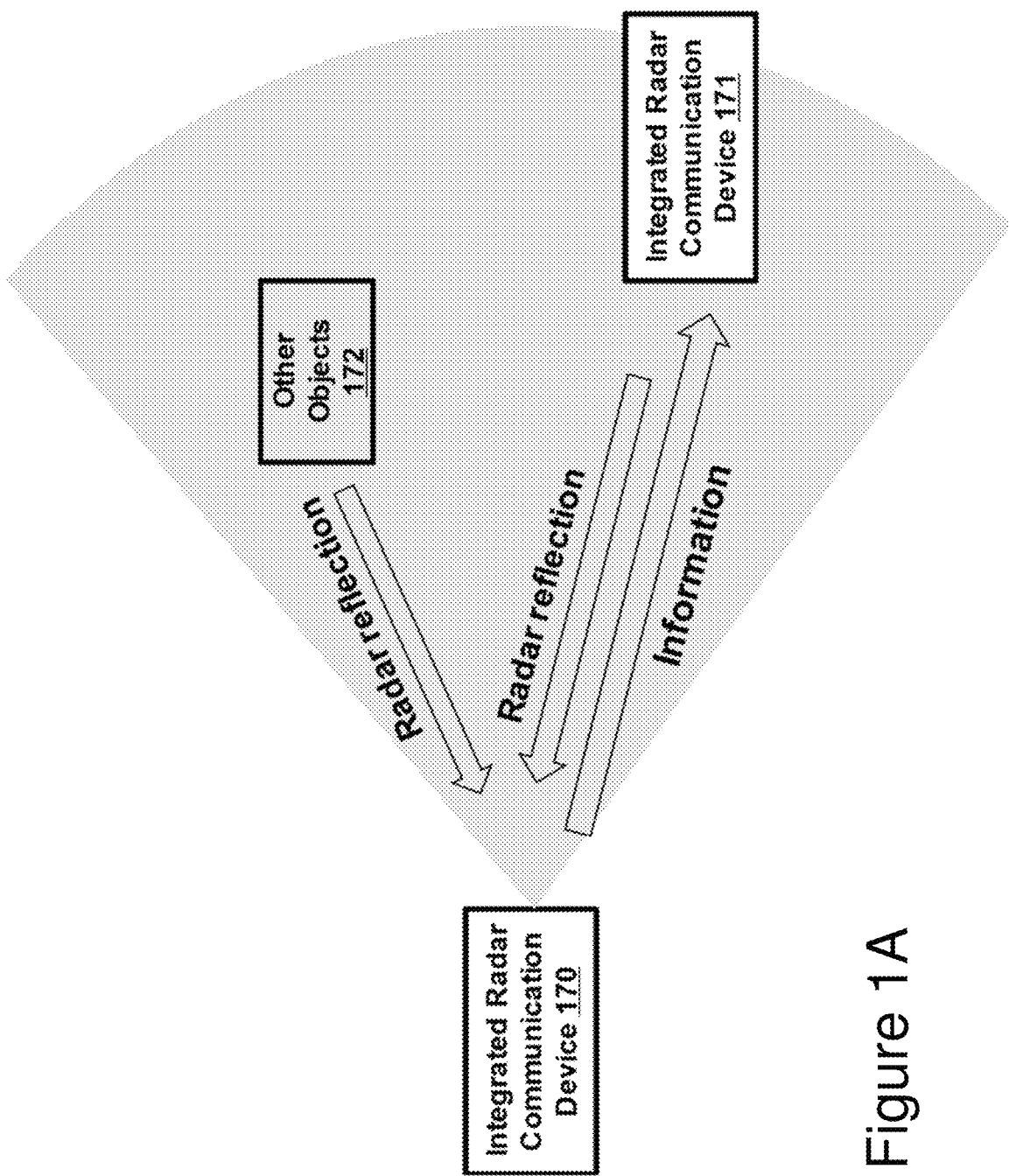
FIG. 1A is a block diagram illustrating an example application of an integrated radar and communication technique.
Figure 1B:
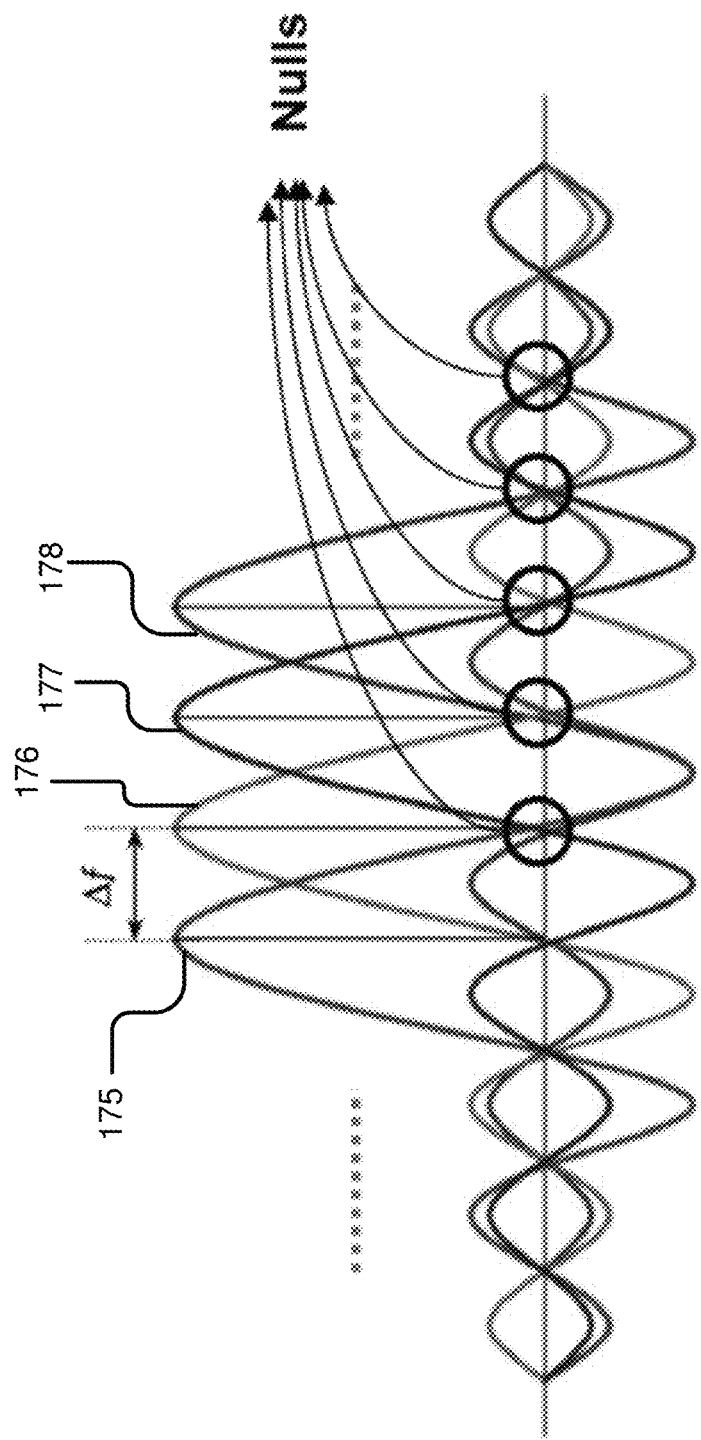
FIG. 1B is a graphical representation illustrating example subcarriers of an OFDM signal.

An example multi-carrier modulation scheme is OFDM, which separates an available bandwidth into multiple narrow bands, with each narrow band carrying one modulated symbol to be transmitted (e.g., each narrow band is represented by a subcarrier, and the subcarrier is modulated using a modulation scheme such as quadrature phase-shift keying (QPSK) or any other suitable type of modulation schemes). FIG. 1B illustrates a signal spectrum of an OFDM signal. The OFDM signal includes, for example, subcarriers 175, 176, 177 and 178 and any other subcarriers not shown in FIG. 1B. On the signal spectrum, the distance between each two adjacent subcarriers (illustrated as Δf in the frequency domain) is designed in such a way that each subcarrier has nulls at locations of other subcarriers, so that each subcarrier does not interfere with other subcarriers. Thus, these subcarriers are referred to as "orthogonal." This orthogonal arrangement allows the subcarriers to be tightly packed instead of separating the subcarriers with a certain margin (when compared to frequency division multiplexing).

The modulation and demodulation of an OFDM signal may be efficiently implemented through fast Fourier transform (FFT) and inverse fast Fourier transform (IFFT), where the FFT transforms a signal (in the time domain) to a spectrum (in the frequency domain), while the IFFT transforms a spectrum back to a corresponding time-domain signal.

When applying an OFDM signal in a radar application, a transmitter of the OFDM signal also uses its receiving antenna(s) to receive reflections of the OFDM signal from objects. A round-trip delay of a received reflection from an object includes distance information (referred to as "range") of the object, while the Doppler effect changes a frequency of the waveform and is used to determine a velocity of the object. For example, in radar processing, a delayed signal introduces a phase shift on each subcarrier. Such phase shift can be determined by comparing the received waveform with the original transmitted waveform. The velocity of the object can be determined by integrating the range processing result over several OFDM symbols.

However, OFDM signals generally use OFDM waveforms which are prone to experience high peak-to-average power ratios (PAPRs). A PAPR describes a relationship between a maximum power of a sample in a given OFDM transmitting symbol and an average power of that OFDM transmitting symbol. For example, a PAPR is a ratio of a peak power to an average power of an OFDM signal. Specifically, due to presence of a large number of independently modulated subcarriers in an OFDM signal, a peak power value of the OFDM signal can be high when compared to an average power value of the OFDM signal. This ratio of the peak power value to the average power value is termed as a PAPR.

A PAPR occurs when in a multicarrier system the different subcarriers are out of phase with each other. At each instant, the subcarriers are different with respect to each other at different phase values. When all the subcarriers achieve the maximum value simultaneously, this may cause the output envelope to suddenly shoot up which causes a 'peak' in the output envelope. Thus, the PAPR issue can result in OFDM signals becoming inoperable and require the use of large amplifiers in order to be able to support the peak power requirement of the OFDM system.

The signal system described herein includes a signal module that modifies OFDM signals so that the modified OFDM signals (also referred to as "combination signals" as described below) use FMCW waveforms instead of OFDM waveforms. This modification helps solve the PAPR problem and makes OFDM signaling systems more suitable for both communication and radar applications in automobiles.

In some embodiments, the signal system includes: (1) a communication subsystem having a receiver and a transmitter for receiving and transmitting OFDM signals or any other suitable types of wireless signals (for both communication and radar purposes); (2) a radar system; and (3) a signal module that is operable to encode an OFDM signal using an FMCW waveform as described below. The signal module can be installed in an onboard unit of a connected vehicle (i.e., the signal system of the vehicle).

At least an advantage and improvement provided by the signal system described herein include that it makes a radar bandwidth (e.g., a radar bandwidth for FMCW) and a communication bandwidth (e.g., a communication bandwidth for OFDM) to be decoupled with one another. As a result, there is no need to generate OFDM signals with a high bandwidth to improve range resolution, thus avoiding high PAPR issues and problems created by the PAPR.

As described herein, some embodiments in the disclosure are illustrated with reference to an OFDM baseband signal while some embodiments in the disclosure are illustrated with reference to a wireless signal. Here, the OFDM baseband signal is an example of the wireless signal. It should be noted that embodiments described herein can be implemented using any suitable type of wireless signals such as the OFDM baseband signal.

As described herein, some embodiments in the disclosure are illustrated with reference to an FMCW waveform while some embodiments in the disclosure are illustrated with reference to an automotive-radar waveform. Here, an automotive-radar waveform is a waveform used in automotive radar applications. The FMCW waveform is an example of the automotive-radar waveform. It should be noted that embodiments described herein can be implemented using any suitable type of automotive-radar waveforms such as the FMCW waveform.

Example Overview

Figure 1C:
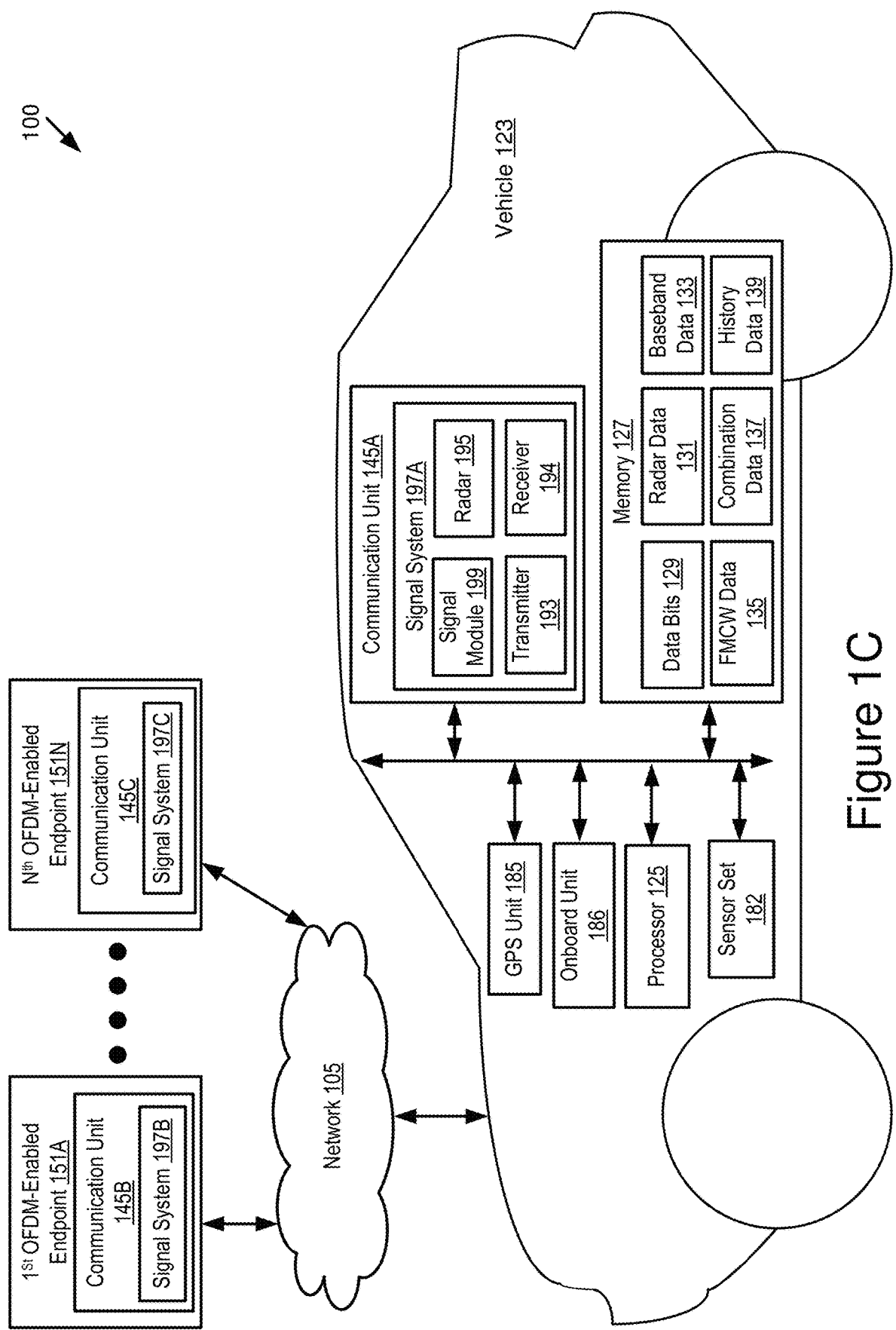
FIG. 1C is a block diagram illustrating an operating environment for a signal module according to some embodiments.

Referring to FIG. 1C, depicted is an operating environment 100 for a signal module 199. The operating environment 100 may include one or more of the following elements: a vehicle 123; and one or more OFDM-enabled endpoints 151 (e.g., a first OFDM-enabled endpoint 151A . . . and an Nth OFDM-enabled endpoint 151N which are referred to as "OFDM-enabled endpoint 151" individually or collectively). These elements of the operating environment 100 may be communicatively coupled to a network 105.

Although one vehicle 123, two OFDM-enabled endpoints 151 and one network 105 are depicted in FIG. 1C, in practice the operating environment 100 may include one or more vehicles 123, one or more OFDM-enabled endpoints 151 and one or more networks 105.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, Long-Term Evolution (LTE), LTE-Vehicle-to-Vehicle (LTE-V2V), LTE-Vehicle-to-Infrastructure (LTE-V2I), LTE-Vehicle-to-Everything (LTE-V2X), LTE-Device-to-Device (LTE-D2D), VoLTE, 5G-V2X or any other mobile data network or combination of mobile data networks. Further, the network 105 may include one or more IEEE 802.11 wireless networks.

In some embodiments, one or more of the vehicle 123 and the OFDM-enabled endpoint 151 may be DSRC-equipped devices. The network 105 may include one or more communication channels shared among the vehicle 123 and the OFDM-enabled endpoint 151. The communication channel may include Dedicated Short-Range Communication (DSRC), LTE-V2X, full-duplex wireless communication or any other wireless communication protocol. For example, the network 105 may be used to transmit a DSRC message, DSRC probe or Basic Safety Message (BSM) including any of the data described herein. However, it should be understood that DSRC is not a requirement here. Any type of V2X radios may be used.

The vehicle 123 may be any type of vehicle. For example, the vehicle 123 may include one of the following types of vehicles: a car; a truck; a sports utility vehicle; a bus; a semi-truck; a drone or any other roadway-based conveyance. In some embodiments, the vehicle 123 can be a connected vehicle that includes a communication unit described below.

In some embodiments, the vehicle 123 may include an autonomous vehicle or a semi-autonomous vehicle. For example, the vehicle 123 may include an Advanced Driver-Assistance System (ADAS system). The ADAS system may provide some or all of the functionality that provides autonomous functionality.

The vehicle 123 may include one or more of the following elements: a processor 125; a memory 127; a communication unit 145A; a GPS unit 185; a sensor set 182; and an onboard unit 186. These elements of the vehicle 123 may be communicatively coupled to one another via a bus.

In some embodiments, the processor 125 and the memory 127 may be elements of an onboard vehicle computer system. The onboard vehicle computer system may be operable to cause or control the operation of the signal module 199. The onboard vehicle computer system may be operable to access and execute the data stored on the memory 127 to provide the functionality described herein for the signal module 199.

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. The vehicle 123 may include one or more processors 125. Other processors, operating systems, sensors, displays, and physical configurations may be possible.

The memory 127 stores instructions or data that may be executed by the processor 125. The instructions or data may include code for performing the techniques described herein. The memory 127 may be a dynamic random-access memory (DRAM) device, a static random-access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. The vehicle 123 may include one or more memories 127.

The memory 127 of the vehicle 123 may store one or more of: data bits 129; radar data 131; baseband data 133; FMCW data 135; combination data 137; and history data 139.

The data bits 129 include digital data that describe a data payload to be transmitted to an intended recipient. For example, the data bits 129 are an input to example processes 500 and 800 depicted in FIGS. 5 and 8 for generation of an OFDM baseband signal.

The radar data 131 includes digital data describing radar feedback associated with a transmitted combination signal. For example, the radar data 131 includes digital data that describes one or more results of radar processing being executed on a reflection of a combination signal described by the combination data 137.

Figure 5:
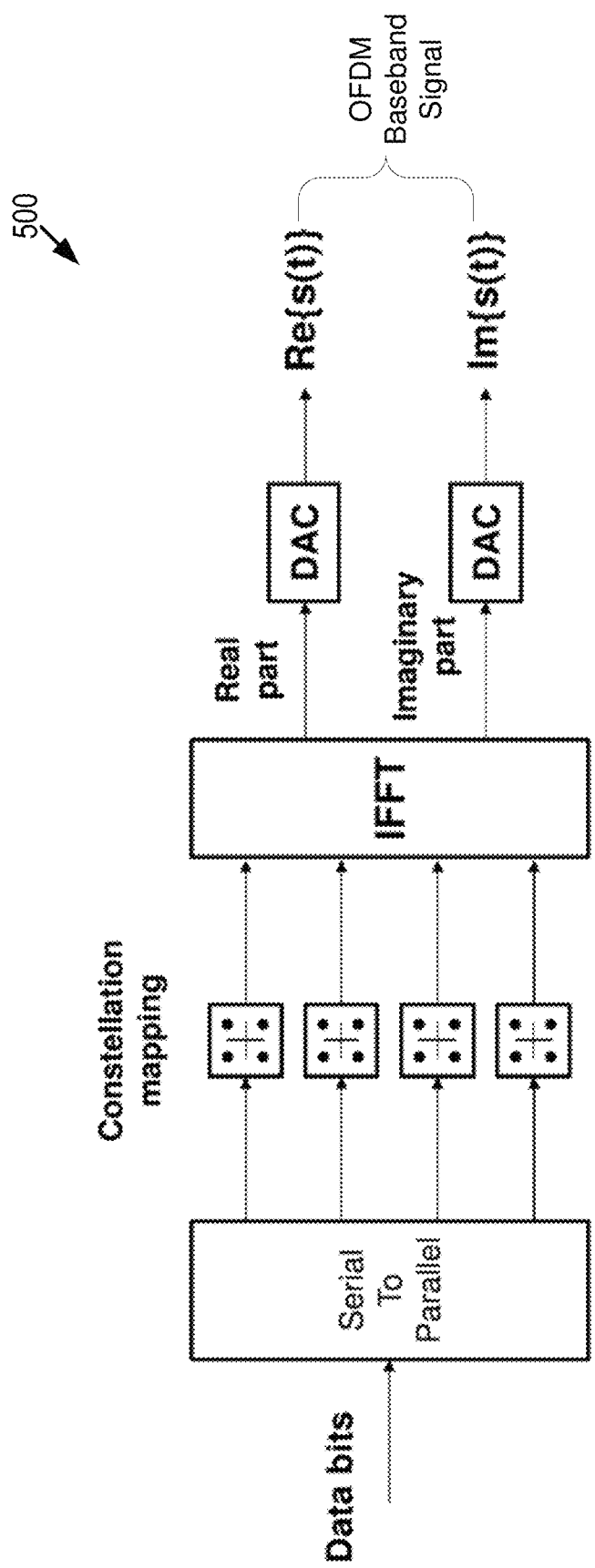
FIG. 5 depicts a block diagram illustrating generation of a wireless signal (e.g., an OFDM baseband signal) according to some embodiments.

The baseband data 133 includes digital data that describes an OFDM baseband signal. An output of the process 500 depicted in FIG. 5 is the baseband data 133. The baseband data 133 is inputted to a process 700 depicted in FIG. 7A for generation of a combination signal.

Figure 6B:
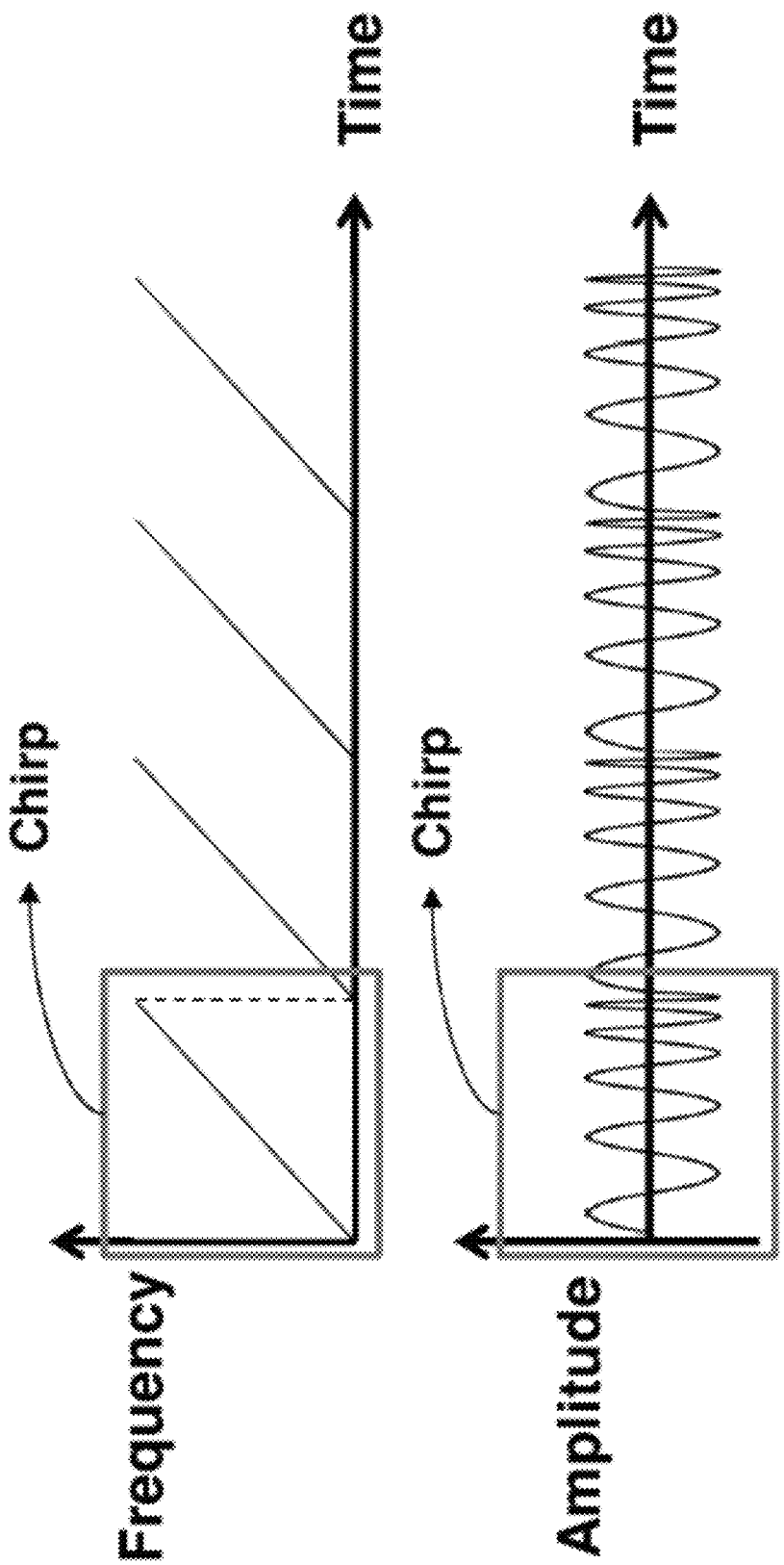
FIG. 6B is a graphical representation illustrating frequency and amplitude of an automotive-radar waveform (e.g., an FMCW waveform) according to some embodiments.

The FMCW data 135 includes digital data that describes an FMCW waveform. A frequency-time structure and an amplitude-time structure of an example FMCW waveform are depicted in FIG. 6B respectively.

The combination data 137 includes digital data that describes a combination signal. The combination signal is formed by, for example, encoding an OFDM baseband signal to include an FMCW waveform and not a standard OFDM waveform. A frequency-time structure of an example combination signal is depicted in part (c) of FIG. 7C.

The history data 139 includes digital data that describes historical radar detection results for one or more transmitted combination signals. In some embodiments, the history data 139 describes radar performance and radar requirements that are indicated based on historical radar detection results.

The communication unit 145A transmits and receives data to and from the network 105 or to another communication channel. In some embodiments, the communication unit 145A may include a DSRC transceiver, a DSRC receiver and other hardware or software necessary to make the vehicle 123 a DSRC-enabled device. For example, the communication unit 145A includes a DSRC antenna configured to broadcast DSRC messages via the network. The DSRC antenna may also transmit BSM messages at a fixed interval (e.g., every 0.1 seconds, at a time interval corresponding to a frequency range from 1.6 Hz to 10 Hz, etc.) that is user configurable.

In some embodiments, the communication unit 145A includes a port for direct physical connection to the network 105 or to another communication channel. For example, the communication unit 145A includes a USB, SD, CAT-5, or similar port for wired communication with the network 105. In some embodiments, the communication unit 145A includes a wireless transceiver for exchanging data with the network 105 or other communication channels using one or more wireless communication methods, including: IEEE 802.11; IEEE 802.16, BLUETOOTH®; EN ISO 14906: 2004 Electronic Fee Collection—Application interface EN 11253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471,387 filed on Aug. 28, 2014 and entitled "Full-Duplex Coordination System"; or another suitable wireless communication method.

In some embodiments, the communication unit 145A includes a full-duplex coordination system as described in U.S. patent application Ser. No. 14/471,387 filed on Aug. 28, 2014 and entitled "Full-Duplex Coordination System."

In some embodiments, the communication unit 145A includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145A includes a wired port and a wireless transceiver. The communication unit 145A also provides other conventional connections to the network 105 for distribution of files or media objects using standard network protocols including TCP/IP, HTTP, HTTPS, and SMTP, millimeter wave, DSRC, etc.

In some embodiments, the communication unit 145A includes any type of V2X communication antenna necessary to support one or more of the following V2X communication protocols: DSRC; mmWave; LTE-V2X; LTE-D2D; 5G-V2X; ITS-G5; ITS-Connect; LPWAN; visible light communication; television white space; Bluetooth; Wi-Fi, etc. The communication unit 145A includes a V2X radio.

The V2X radio is an electronic device that includes a V2X transmitter and a V2X receiver and is operable to send and receive wireless messages via any V2X protocol. For example, the V2X radio is operable to send and receive wireless messages via DSRC. The V2X transmitter is operable to transmit and broadcast DSRC messages over the 5.9 GHz band. The V2X receiver is operable to receive DSRC messages over the 5.9 GHz band. The V2X radio includes multiple channels with at least one of these channels designated for sending and receiving BSMs and at least one of these channels designated for sending and receiving Personal Safety Messages (PSMs).

In some embodiments, the communication unit 145A includes a signal system 197A. The signal system 197A includes hardware and software used for implementing data communications and radar processing. For example, the signal system 197A includes the signal module 199, a radar 195, a transmitter 193 and a receiver 194.

The transmitter 193 is a transmitter used for transmitting combination signals or any other suitable types of signals. The receiver 194 is a receiver used for receiving combination signals or any other suitable types of signals. In some embodiments, the transmitter 193 and the receiver 194 may be combined into a transceiver.

The radar 195 includes a radar system that is used for detecting and processing radar feedback associated with combination signals. For example, the radar 195 listens for radar feedback associated with a combination signal after the transmitter 193 transmits the combination signal. The radar 195 detects the radar feedback based on the listening and stores the radar feedback for further processing.

In some embodiments, the signal module 199 includes software that is operable, when executed by the processor 125, to cause the processor 125 to execute one or more steps of methods 300 and 400 and processes 500, 600, 700 and 800 described below with reference to FIGS. 3-6A, 7A and 8. In some embodiments, the signal module 199 may be implemented using hardware including a field-programmable gate array ("FPGA") or an application-specific integrated circuit ("ASIC"). In some other embodiments, the signal module 199 may be implemented using a combination of hardware and software. The signal module 199 may be stored in a combination of the devices (e.g., servers or other devices), or in one of the devices.

The signal module 199 is described below in more detail with reference to FIGS. 2-10.

In some embodiments, the GPS unit 185 includes any hardware and software necessary to make the vehicle 123 or the GPS unit 185 compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

In some embodiments, the GPS unit 185 is a DSRC-compliant GPS unit that includes any hardware and software necessary to make the vehicle 123 or the DSRC-compliant GPS unit compliant with one or more of the following DSRC standards, including any derivative or fork thereof: IEEE 802.11; IEEE 1609.x (x=2, 3, 4); SAE J2735; SAE J2945.x (x=0, 1, and others), etc.

In some embodiments, the DSRC-compliant GPS unit is operable to provide GPS data describing the location of the vehicle 123 with lane-level accuracy.

In some embodiments, the DSRC-compliant GPS unit includes hardware that wirelessly communicates with a GPS satellite to retrieve GPS data that describes the geographic location of the vehicle 123 with a precision that is compliant with the DSRC standard. The DSRC standard requires that GPS data be precise enough to infer if two vehicles (one of which is, for example, the vehicle 123) are located in adjacent lanes of travel. In some embodiments, the DSRC-compliant GPS unit is operable to identify, monitor and track its two-dimensional position within 1.5 meters of its actual position 68% of the time under an open sky. Since driving lanes are typically no less than 3 meters wide, whenever the two-dimensional error of the GPS data is less than 1.5 meters the signal module 199 described herein may analyze the GPS data provided by the DSRC-compliant GPS unit and determine what lane the vehicle 123 is traveling in based on the relative positions of two or more different vehicles (one of which is, for example, the vehicle 123) traveling on the roadway at the same time.

In some embodiments, the GPS unit 185 is a conventional GPS unit. For example, the GPS unit 185 may include hardware that wirelessly communicates with a GPS satellite to retrieve data that describes a geographic location of the vehicle 123. For example, the GPS unit 185 retrieves the GPS data from one or more GPS satellites.

By comparison to a DSRC-compliant GPS unit, a conventional GPS unit which is not compliant with the DSRC standard is unable to determine the location of a vehicle with lane-level accuracy. For example, a typical roadway lane is approximately 3 meters wide. However, a conventional GPS unit only has an accuracy of plus or minus 10 meters relative to the actual location of the vehicle. As a result, such conventional GPS units are not sufficiently accurate to identify a lane of travel for a vehicle based on GPS data alone; instead, systems having only conventional GPS units must utilize sensors such as cameras to identify the lane of travel of the vehicle. Identifying a lane of travel of a vehicle is beneficial, for example, because in some embodiments it may enable the signal module 199 to more accurately identify a location of the vehicle 123 traveling in a roadway having multiple lanes of travel.

The sensor set 182 includes one or more sensors that are operable to measure a roadway environment outside of the vehicle 123. For example, the sensor set 182 may include one or more sensors that record one or more physical characteristics of the road environment that is proximate to the vehicle 123. The memory 127 may store sensor data that describes the one or more physical characteristics recorded by the sensor set 182.

In some embodiments, the sensor set 182 may include one or more of the following vehicle sensors: a camera; a LIDAR sensor; a radar sensor; a laser altimeter; an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

The onboard unit 186 may be any computing unit onboard on the vehicle 123. For example, the onboard unit 186 may include an electronic control unit (ECU). The ECU is an embedded system in automotive electronics that controls one or more of electrical systems or subsystems in the vehicle 123. Types of the ECU include, but are not limited to, the following: Engine Control Module (ECM); Powertrain Control Module (PCM); Transmission Control Module (TCM); Brake Control Module (BCM or EBCM); Central Control Module (CCM); Central Timing Module (CTM); General Electronic Module (GEM); Body Control Module (BCM); and Suspension Control Module (SCM), etc.

In some embodiments, the vehicle 123 may include multiple onboard units 186. In some embodiments, the signal module 199 may be an element of the onboard unit 186.

Figure 7A:
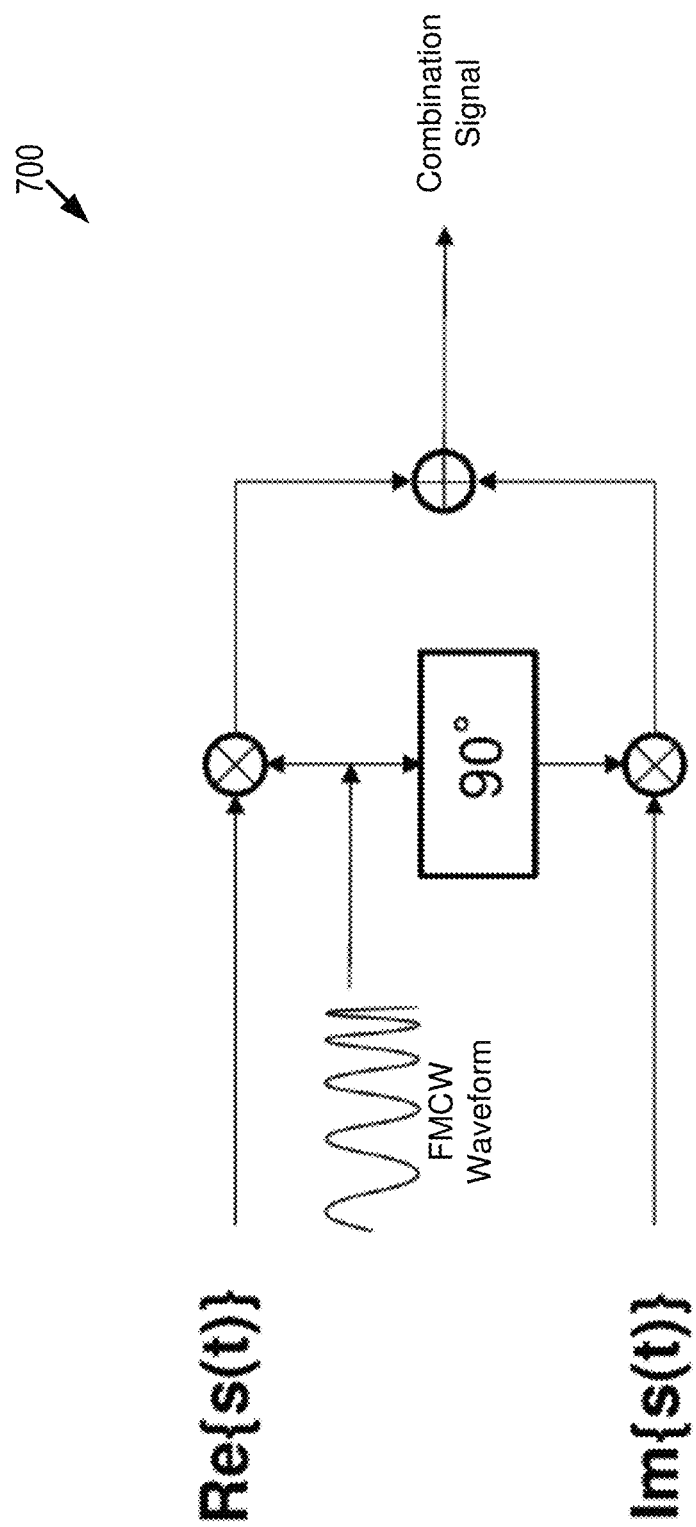
FIG. 7A depicts a block diagram illustrating generation of a combination signal based on the wireless signal of FIG. 5 and the automotive-radar waveform of FIGS. 6A-6B according to some embodiments.
Figure 7B:
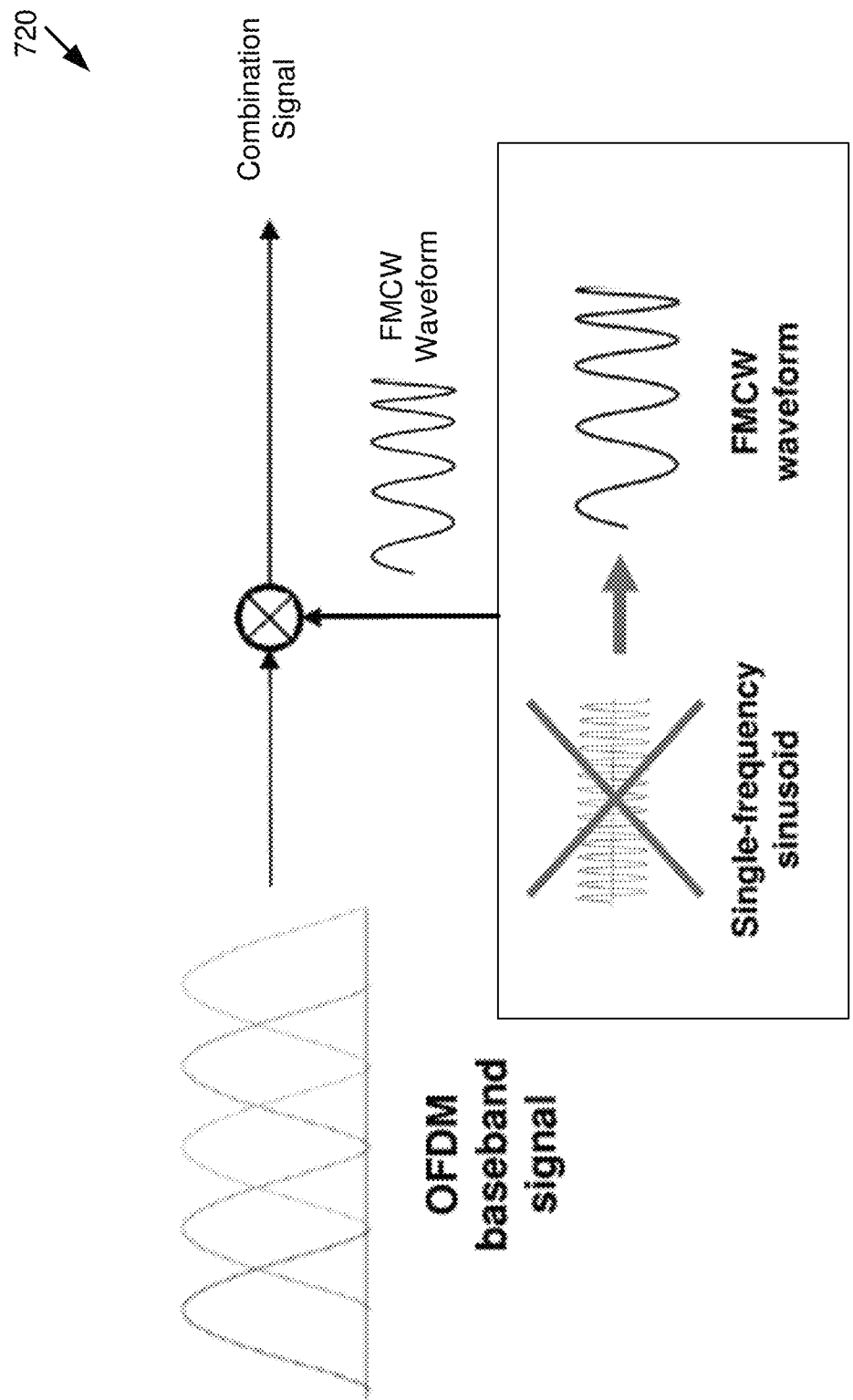
FIG. 7B depicts another block diagram illustrating generation of a combination signal based on the wireless signal of FIG. 5 and the automotive-radar waveform of FIGS. 6A-6B according to some embodiments.
Figure 7C:
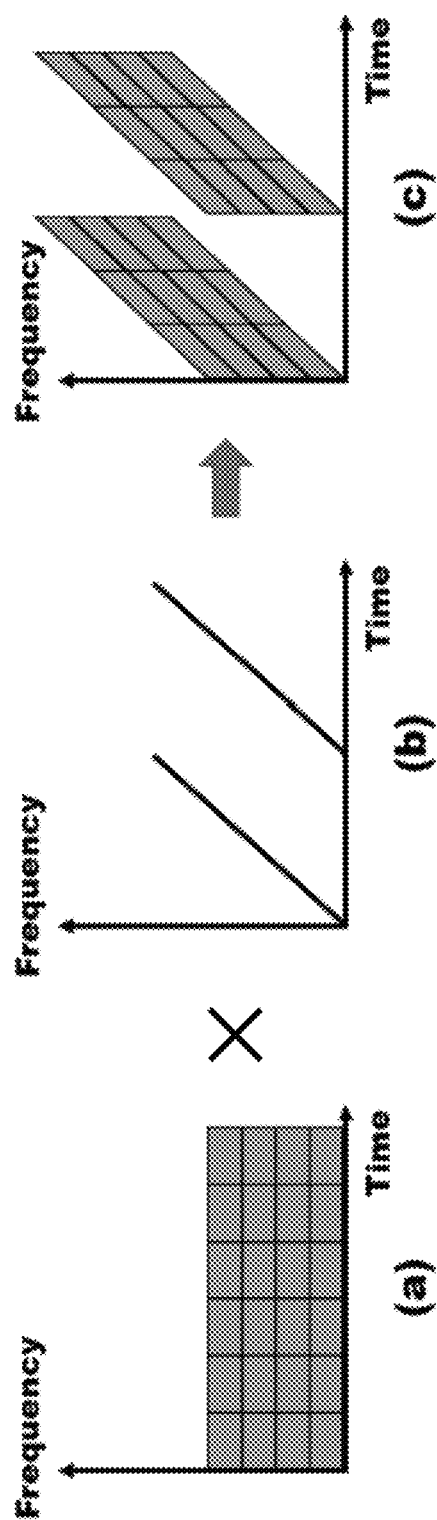
FIG. 7C is a graphical representation illustrating generation of a combination signal that has a multi-carrier modulated FMCW waveform according to some embodiments.

The OFDM-enabled endpoint 151 is a processor-based computing device that includes a communication unit that is similar to the one installed in the vehicle 123. In some embodiments, the OFDM-enabled endpoint 151 includes an instance of the signal system 197. The OFDM-enabled endpoint 151 is operable to transmit and receive combination signals that are generated by encoding OFDM baseband signals using an approach as illustrated in FIGS. 7A-7C. In some embodiments, the operating environment 100 includes N number of OFDM-enabled endpoints 151, where N is a positive integer that is greater than one. In some embodiments, the OFDM-enabled endpoint 151 is a connected vehicle, a roadside unit (RSU), an edge server, a cloud server, or any other processor-based computing device that is operable to send and receive combination signals. In some embodiments, any combination of connected vehicles, RSUs, edge servers, and cloud servers, etc., may include instances of the signal system 197 so that the functionality of the signal system 197 is implemented in a distributed fashion among two or more endpoints connected to the network 105.

By way of examples, in FIG. 1C the first OFDM-enabled endpoint 151A includes a communication unit 145B (that includes a signal system 197B), and the Nth OFDM-enabled endpoint 151N includes a communication unit 145C (that includes a signal system 197C).

The communication units 145B and 145C may have a structure similar to that of the communication unit 145A and provide functionality similar to that of the communication unit 145A. Similar description is not repeated here. The communication units 145A, 145B and 145C may be referred to as "communication unit 145" individually or collectively.

The signal systems 197B and 197C may have a structure similar to that of the signal system 197A and provide functionality similar to that of the signal system 197A. Similar description is not repeated here. The signal systems 197A, 197B and 197C may be referred to as "signal system 197" individually or collectively.

An example process executed by the signal module 199 is described here. In some embodiments, the signal module 199 includes code and routines that are operable, when executed by the processor 125 of the vehicle 123, to cause the processor 125 to execute operations including one or more of the following: (1) generating an OFDM baseband signal (see, e.g., FIG. 5); (2) generating an FMCW waveform (see, e.g., FIG. 6A); (3) modulating the FMCW waveform with the OFDM baseband signal to generate a combination signal (i.e., an OFDM signal that includes a FMCW waveform) (see, e.g., FIGS. 7A-7C); (4) transmitting the combination signal using the transmitter 193; (5) listening for radar feedback using the receiver 194; (6) receiving the radar feedback; and (7) processing the radar feedback to identify radar information about a recipient of the combination signal (see, e.g., FIGS. 9-10).

At least one benefit of mixing the OFDM baseband signal with the FMCW waveform to generate the combination signal includes: decoupling the radar bandwidth for the FMCW waveform and the communication bandwidth for the OFDM baseband signal. For example, when the radar bandwidth (e.g., the bandwidth of the FMCW waveform) and the communication bandwidth (e.g., the bandwidth of the OFDM baseband signal) are decoupled with one another, the radar bandwidth can be increased to improve range resolution with no need to increasing the communication bandwidth. In this case, it is easier to generate a signal with a large bandwidth for radar processing when compared with an OFDM radar. There is no need to generate an OFDM signal with a high bandwidth to improve range resolution, thus avoiding issues associated with a high peak to average power ratio (PAPR). Furthermore, the communication bandwidth of the OFDM baseband signal can be reduced without reducing the radar bandwidth. A lower communication bandwidth of the OFDM baseband signal reduces requirements on circuit components (e.g., analog-to-digital converters). Of course, the communication bandwidth can be increased if a larger data rate is needed.

Example Computer System

Figure 2:
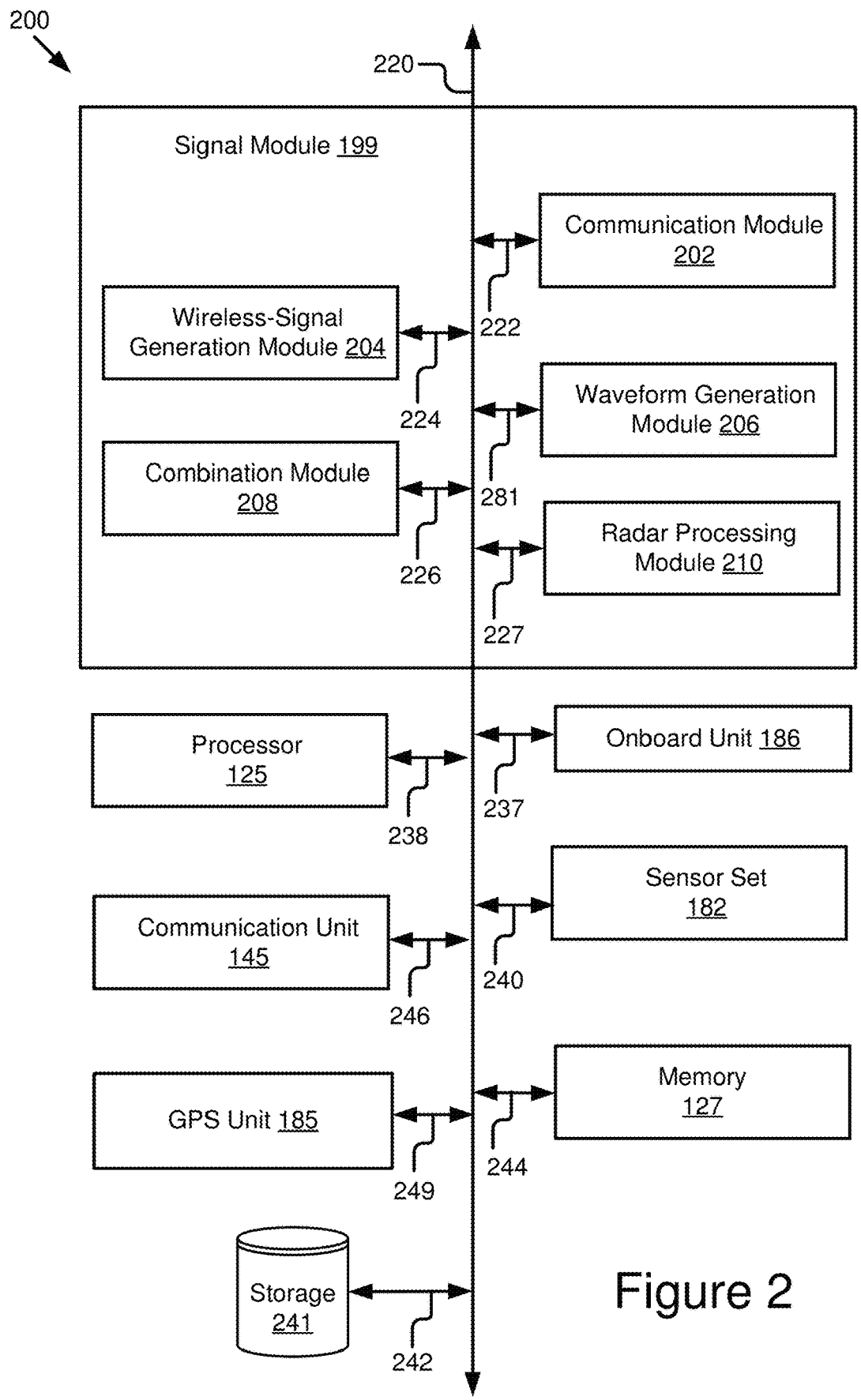
FIG. 2 is a block diagram illustrating an example computer system including a signal module according to some embodiments.

Referring now to FIG. 2, depicted is a block diagram illustrating an example computer system 200 including the signal module 199 according to some embodiments. In some embodiments, the computer system 200 may include a special-purpose computer system that is programmed to perform one or more steps of methods 300 and 400 and processes 500, 600, 700 and 800 described below with reference to FIGS. 3-6A, 7A and 8.

In some embodiments, the computer system 200 may be an element of a connected device (e.g., the vehicle 123). The computer system 200 may include one or more of the following elements according to some examples: the signal module 199; the processor 125; the communication unit 145; the GPS unit 185; the onboard unit 186; the sensor set 182; the memory 127; and a storage 241. The components of the computer system 200 are communicatively coupled by a bus 220.

In the illustrated embodiment, the processor 125 is communicatively coupled to the bus 220 via a signal line 238. The communication unit 145 is communicatively coupled to the bus 220 via a signal line 246. The GPS unit 185 is communicatively coupled to the bus 220 via a signal line 249. The onboard unit 186 is communicatively coupled to the bus 220 via a signal line 237. The sensor set 182 is communicatively coupled to the bus 220 via a signal line 240. The storage 241 is communicatively coupled to the bus 220 via a signal line 242. The memory 127 is communicatively coupled to the bus 220 via a signal line 244.

The following elements of the computer system 200 are described above with reference to FIG. 1C, and so, those descriptions will not be repeated here: the processor 125; the communication unit 145; the GPS unit 185; the onboard unit 186; the sensor set 182; and the memory 127.

The memory 127 may store any of the data described above with reference to FIG. 1C. The memory 127 may store any data necessary for the computer system 200 to provide its functionality.

The storage 241 can be a non-transitory storage medium that stores data for providing the functionality described herein. The storage 241 may be a dynamic random-access memory (DRAM) device, a static random-access memory (SRAM) device, flash memory, or some other memory devices. In some embodiments, the storage 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated embodiment shown in FIG. 2, the signal module 199 includes: a communication module 202; a wireless-signal generation module 204; a waveform generation module 206; a combination module 208; and a radar processing module 210. These components of the signal module 199 are communicatively coupled to each other via the bus 220. In some embodiments, components of the signal module 199 can be stored in a single server or device. In some other embodiments, components of the signal module 199 can be distributed and stored across multiple servers or devices. For example, some of the components of the signal module 199 may be distributed across the vehicle 123 and the OFDM-enabled endpoint 151.

The communication module 202 can be software including routines for handling communications between the signal module 199 and other components of the computer system 200. In some embodiments, the communication module 202 can be stored in the memory 127 of the computer system 200 and can be accessible and executable by the processor 125. The communication module 202 may be adapted for cooperation and communication with the processor 125 and other components of the computer system 200 via a signal line 222.

The communication module 202 sends and receives data, via the communication unit 145, to and from one or more elements of the operating environment 100. For example, the communication module 202 receives or transmits, via the communication unit 145, combination signals and reflections of the combination signals (e.g., radar feedback of the combination signals). The communication module 202 may send or receive any of the data or messages described above with reference to FIG. 1C via the communication unit 145.

In some embodiments, the communication module 202 receives data from components of the signal module 199 and stores the data in one or more of the storage 241 and the memory 127. For example, the communication module 202 receives any of the data described above with reference to the memory 127 from the communication unit 145 (via the network 105, a combination signal, a DSRC message, a BSM, a DSRC probe, a full-duplex wireless message, etc.)

and stores this data in the memory 127 (or temporarily in the storage 241 which may act as a buffer for the computer system 200).

In some embodiments, the communication module 202 may handle communications between components of the signal module 199. For example, the communication module 202 may handle communications among the wireless-signal generation module 204, the waveform generation module 206, the combination module 208 and the radar processing module 210. Any of these modules may cause the communication module 202 to communicate with the other elements of the computer system 200 or the operating environment 100 (via the communication unit 145).

The wireless-signal generation module 204 can be software including routines for constructing a wireless signal such as an OFDM baseband signal. In some embodiments, the wireless-signal generation module 204 can be stored in the memory 127 of the computer system 200 and can be accessible and executable by the processor 125. The wireless-signal generation module 204 may be adapted for cooperation and communication with the processor 125 and other components of the computer system 200 via a signal line 224.

In some embodiments, the wireless-signal generation module 204 is operable to generate a wireless signal based on a set of subcarriers. The set of subcarriers can be orthogonal subcarriers in the frequency domain such that each subcarrier has nulls at locations of other subcarriers (e.g., similar to that illustrated in FIG. 1B). For example, the wireless-signal generation module 204 constructs the wireless signal as a combination of the set of subcarriers with each subcarrier encoded with a corresponding data symbol. In some embodiments, the set of subcarriers are baseband subcarriers, and the wireless signal is a baseband signal.

For example, the wireless signal is an OFDM baseband signal. With reference to FIG. 5, an example process 500 for generating the OFDM baseband signal is illustrated. Specifically, the wireless-signal generation module 204 generates the OFDM baseband signal by performing one or more of the following operations: (1) converting data bits from a serial format to a parallel format; (2) modulating the converted data bits into symbols with a modulation scheme such as QPSK or quadrature amplitude modulation (QAM) (see "constellation mapping" in FIG. 5); (3) encoding the modulated symbols on the subcarriers (in the frequency domain) to generate an intermediate signal; (4) performing IFFT to obtain time domain samples of the intermediate signal (e.g., the time domain samples are separate into a real part and an imaginary part); and (5) using digital-to-analog converters (DAC) to convert the time domain samples into analog signals (e.g., the real part is transformed into an analog signal Re{s(t)}, and the imaginary part is transformed into an analog signal Im{s(t)}). The wireless-signal generation module 204 generates the OFDM baseband signal to include the analog signal Re{s(t)} and the analog signal Im{s(t)}.

In some embodiments, the wireless-signal generation module 204 inputs the wireless signal such as the OFDM baseband signal to the combination module 208 for generation of a combination signal.

The waveform generation module 206 can be software including routines for constructing an automotive-radar waveform such as an FMCW waveform. In some embodiments, the waveform generation module 206 can be stored in the memory 127 of the computer system 200 and can be accessible and executable by the processor 125. The waveform generation module 206 may be adapted for cooperation and communication with the processor 125 and other components of the computer system 200 via a signal line 281.

In some embodiments, the waveform generation module 206 generates an automotive-radar waveform that includes a series of chirps, with each chirp including a sinusoidal signal whose frequency changes linearly over time.

For example, the automotive-radar waveform is an FMCW waveform. With reference to FIG. 6A, an example process 600 for generating the FMCW waveform is illustrated. Specifically, the waveform generation module 206 performs one or more of the following operations to generate the FMCW waveform: (1) generating a chirp based on a control signal; (2) generating a sinusoidal signal using a voltage-controlled oscillator (VCO) with an input of the chirp, where a frequency of the sinusoidal signal changes linearly within a duration of the chirp; and (3) repeating operations (1) and (2) to generate the FMCW waveform that includes a series of sinusoidal signals.

With reference to FIG. 6B, a frequency of the series of sinusoidal signals in the FMCW waveform is depicted using a frequency-time structure, where a first coordinate denotes "time" and a second coordinate denotes "frequency." The FMCW waveform is also depicted using an amplitude-time structure, where a first coordinate denotes "time" and a second coordinate denotes "amplitude." Within a duration of each chirp, a frequency of a corresponding sinusoidal signal increases linearly.

In some embodiments, the waveform generation module 206 inputs the automotive-radar waveform such as the FMCW waveform to the combination module 208 for generation of a combination signal.

The combination module 208 can be software including routines for generating a combination signal. In some embodiments, the combination module 208 can be stored in the memory 127 of the computer system 200 and can be accessible and executable by the processor 125. The combination module 208 may be adapted for cooperation and communication with the processor 125 and other components of the computer system 200 via a signal line 226.

In some embodiments, the combination module 208 is operable to combine the wireless signal with the automotive-radar waveform to generate a combination signal for the integrated automotive radar and communication application so that a radar bandwidth for the automotive-radar waveform is decoupled from a communication bandwidth for the wireless signal. For example, the combination module 208 modulates the automotive-radar waveform with the wireless signal to generate the combination signal. The radar bandwidth for the automotive-radar waveform is not coupled to the communication bandwidth for the wireless signal, so that the radar bandwidth can be increased without increasing the communication bandwidth (e.g., the radar bandwidth is increased without a need to increase the communication bandwidth). In this case, it is easier to generate a signal with a large bandwidth for radar processing when compared to an OFDM radar.

For example, the wireless signal includes an OFDM baseband signal, the automotive-radar waveform includes an FMCW waveform, and the combination signal includes an OFDM signal that includes a multi-carrier modulated FMCW waveform. The FMCW waveform has a larger bandwidth and a lower peak to average power ratio than a standard OFDM waveform.

With reference to FIG. 7A, an example process 700 to generate the combination signal is illustrated. Specifically, the combination module 208 generates the combination signal by mixing the OFDM baseband signal with the FMCW waveform to generate the combination signal. For example, the combination module 208 performs one or more of the following operations: mixing the analog signal Re{s(t)} of the OFDM baseband signal with the FMCW waveform to generate a first mixed signal; shifting a phase of the FMCW waveform by 90 degrees and mixing the analog signal Im{s(t)} of the OFDM baseband signal with the phase-shifted FMCW waveform to generate a second mixed signal; and combining the first mixed signal with the second mixed signal to generate the combination signal.

With reference to FIG. 7B, another process 720 for generating the combination signal is illustrated. For example, from a perspective of the OFDM baseband signal, the generation of the combination signal can be viewed as changing a carrier signal from a single-frequency sinusoid signal to the FMCW waveform. That is, the FMCW waveform acts as the carrier signal for the OFDM baseband signal.

On the other hand, from a perspective of the FMCW waveform, the generation of the combination signal can be viewed as a multi-carrier modulation on the FMCW waveform. The combination signal can be viewed as a multi-carrier modulated FMCW waveform.

For example, with reference to FIG. 7C, the combination signal is generated by mixing the OFDM baseband signal with the OFDM waveform. Specifically, part (a) depicts a frequency-time structure of the OFDM baseband signal, part (b) depicts a frequency-time structure of the FMCW waveform, and part (c) depicts a frequency-time structure of the combination signal. The frequency-time structure of the combination signal is a mixture of the frequency-time structure of the OFDM baseband signal and the frequency-time structure of the FMCW waveform.

Figure 8:
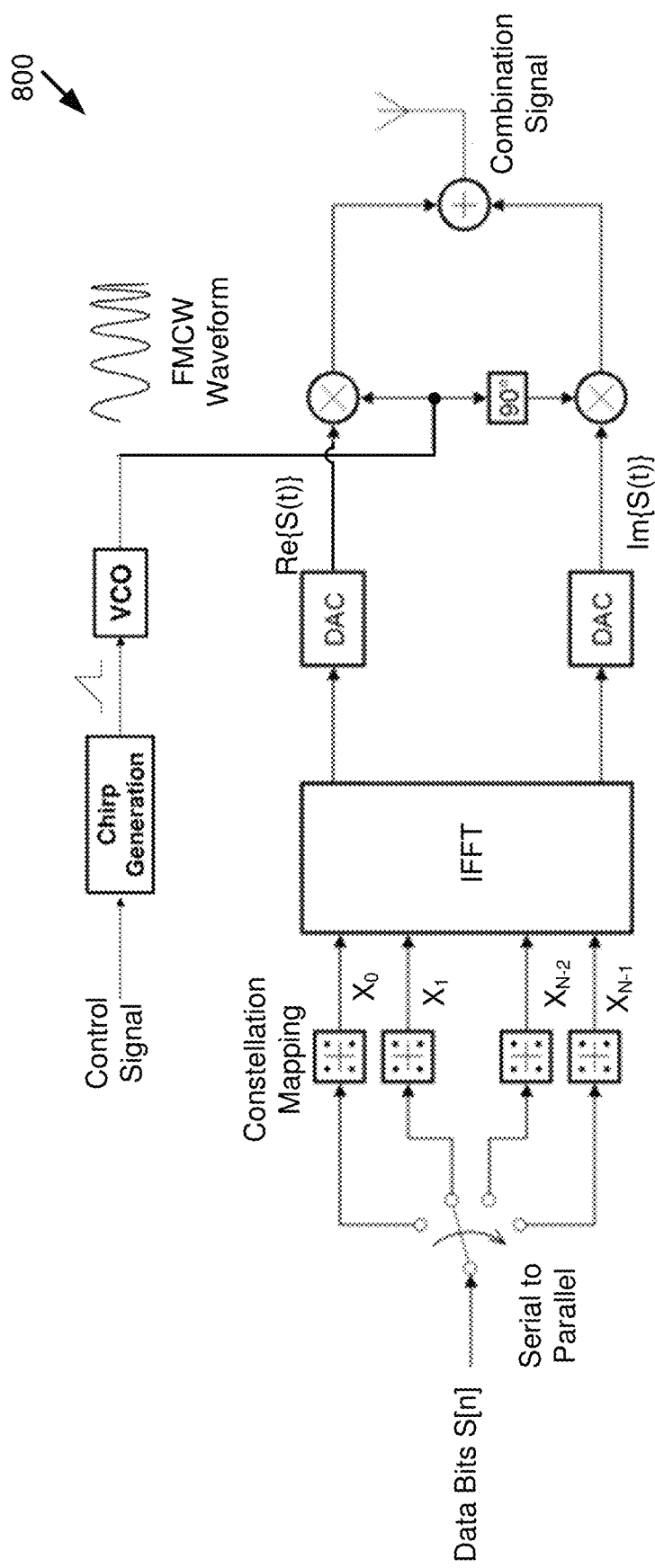
FIG. 8 is a block diagram illustrating generation of a combination signal from data bits according to some embodiments.

An example of an entire process 800 for generating the combination signal from the data bits is illustrated in FIG. 8, which is a combination of FIGS. 5, 6A and 7A. Similar description is not repeated here.

The combination module 208 transmits the combination signal to an intended recipient. For example, the combination module 208 transmits the combination signal via the transmitter 193.

The radar processing module 210 can be software including routines for processing radar feedback. In some embodiments, the radar processing module 210 can be stored in the memory 127 of the computer system 200 and can be accessible and executable by the processor 125. The radar processing module 210 may be adapted for cooperation and communication with the processor 125 and other components of the computer system 200 via a signal line 227.

In some embodiments, the radar processing module 210 is operable to listen for radar feedback associated with the combination signal using one or more of the receiver 194 and the radar 195. The radar processing module 210 performs radar processing on the radar feedback to generate a radar detection result. In some examples, the radar detection result includes range information and velocity information of one or more objects that reflect the transmitted combination signal. For example, the radar processing module 210 processes the radar feedback to identify radar information about a recipient of the combination signal, where the radar information includes range information and velocity information of the recipient.

In some embodiments, the radar processing module 210 performs range processing on the radar feedback to generate a preliminary range result. As described above, the generation of the combination signal can be viewed as a multi-carrier modulation on the FMCW waveform. The preliminary range result includes data describing a beat frequency that is mixed with the multi-carrier modulation. The radar processing module 210 uses the multi-carrier modulation to construct a matched filter and applies the matched filter to restore the beat frequency from the preliminary range result. The radar processing module 210 determines range information of one or more objects that reflect the transmitted combination signal based on the beat frequency. For example, the radar processing module 210 determines range information of a recipient of the combination signal based on the beat frequency.

In some embodiments, the radar processing module 210 also performs velocity processing on the radar feedback to determine velocity information of the one or more objects.

In some embodiments, the radar processing module 210 performs the range processing and the velocity processing together using a two dimensional fast Fourier transform (2D-FFT) on the radar feedback so that the preliminary range result and the velocity information are generated, where a first dimensional FFT of the 2D-FFT corresponds to the range processing and a second dimensional FFT of the 2D-FFT corresponds to the velocity processing. Then, the radar processing module 210 can apply matched filtering to determine the beat frequency from the preliminary range result.

Figure 9:
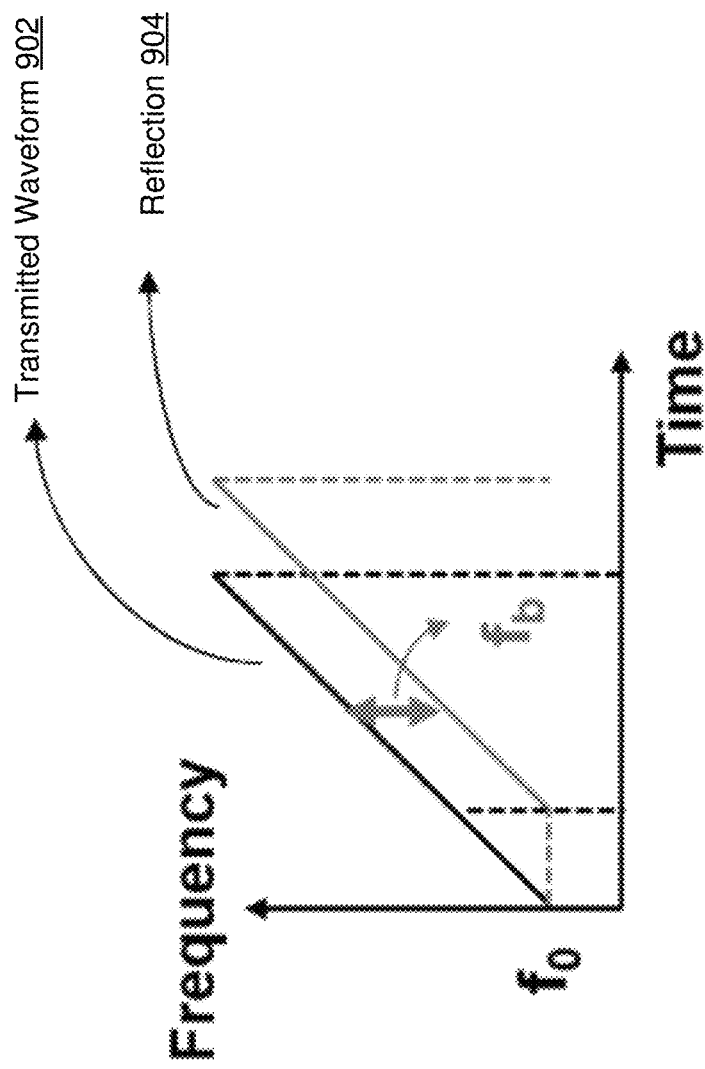
FIG. 9 is a graphical representation illustrating radar processing according to some embodiments.

For example, with reference to FIG. 9, a reflection from an object at a distance "R" (referred to as "range") has a round-trip delay of $\tau=2R/c$, where "c" is the light speed. The delay $\tau$ introduces a constant frequency difference between a transmitted waveform 902 and a reflection 904 of the transmitted waveform within a chirp, where the frequency difference is referred to as a beat frequency "$f_b$." Based on a measurement of the beat frequency "$f_b$," the radar processing module 210 can determine the range "R." For example, according to an equation:

$$\tau = \frac{f_b}{df/dt},$$

the radar processing module 210 calculates a value for the range "R" as $$R = \tau \times c/2 = \frac{c \times f_b}{2 \times (df/dt)},$$

where "df/dt" represents a frequency shift per unit of time. Furthermore, the radar processing module 210 determines the velocity information of the one or more objects by integrating the range processing results over multiple chirps.

Figure 10:
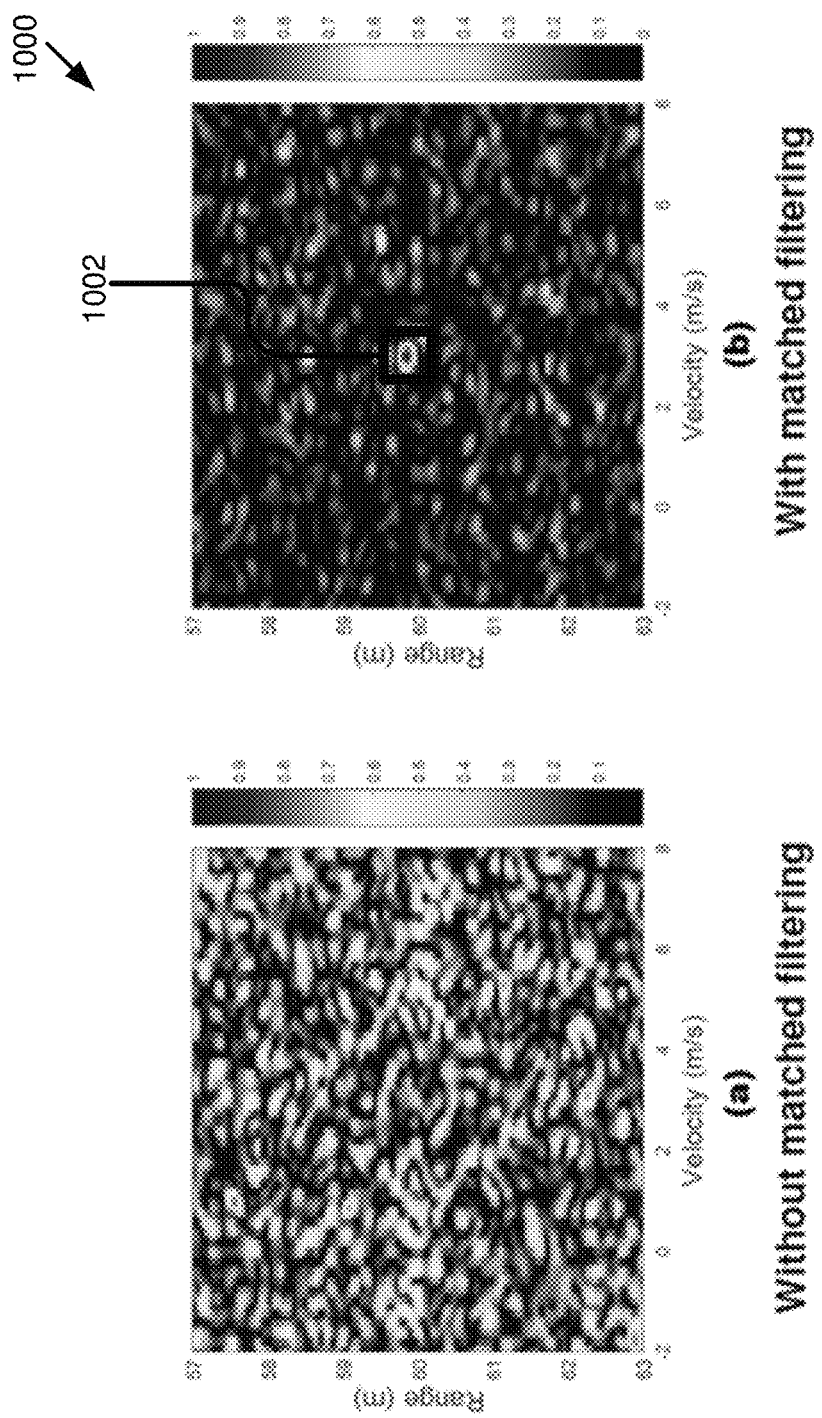
FIG. 10 is a graphical representation illustrating a comparison of radar processing results with or without a matched filter according to some embodiments.

For example, with reference to FIG. 10, a comparison 1000 of radar processing results with or without a matched filter is illustrated according to some embodiments. Part (a) of FIG. 10 shows a radar processing result without matched filtering (e.g., without application of a matched filter), and part (b) of FIG. 10 shows a radar processing result with matched filtering (e.g., with application of a matched filter). By comparing part (a) with part (b), part (b) shows that an object is detected with a range and a velocity marked up in a box 1002 in FIG. 10.

Example Processes

Figure 3:
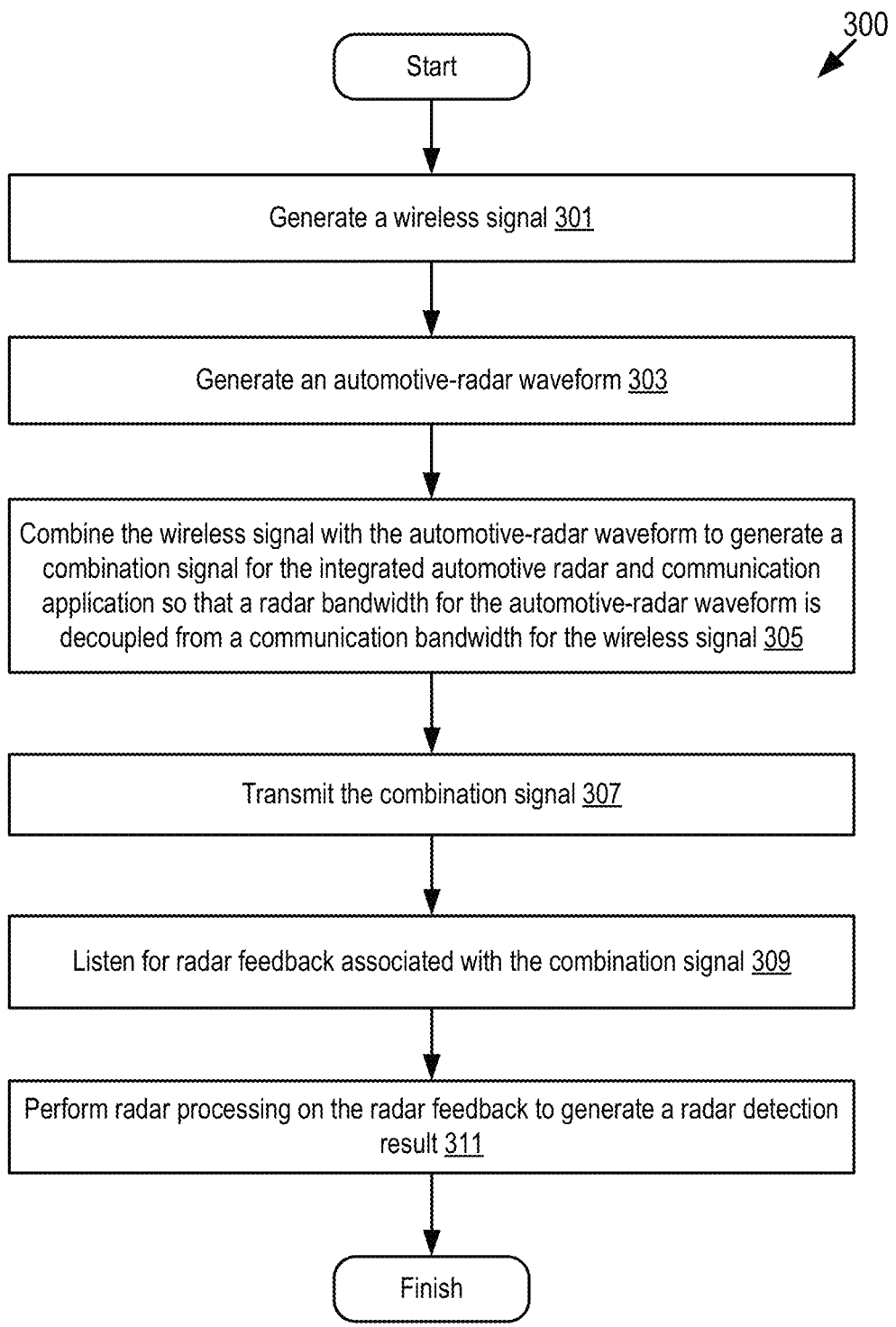
FIG. 3 depicts a method for performing integrated automotive radar processing and data communications according to some embodiments.

Referring now to FIG. 3, depicted is a flowchart of an example method 300 for performing integrated automotive radar processing and data communications according to some embodiments. The steps of the method 300 are executable in any order, and not necessarily the order depicted in FIG. 3.

At step 301, the wireless-signal generation module 204 generates a wireless signal.

At step 303, the waveform generation module 206 generates an automotive-radar waveform.

At step 305, the combination module 208 combines the wireless signal with the automotive-radar waveform to generate a combination signal for the integrated automotive radar and communication application so that a radar bandwidth for the automotive-radar waveform is decoupled from a communication bandwidth for the wireless signal.

At step 307, the combination module 208 transmits the combination signal using the transmitter 193.

At step 309, the radar processing module 210 listens for radar feedback associated with the combination signal using one or more of the receiver 194 and the radar 195.

At step 311, the radar processing module 210 performs radar processing on the radar feedback to generate a radar detection result.

Figure 4:
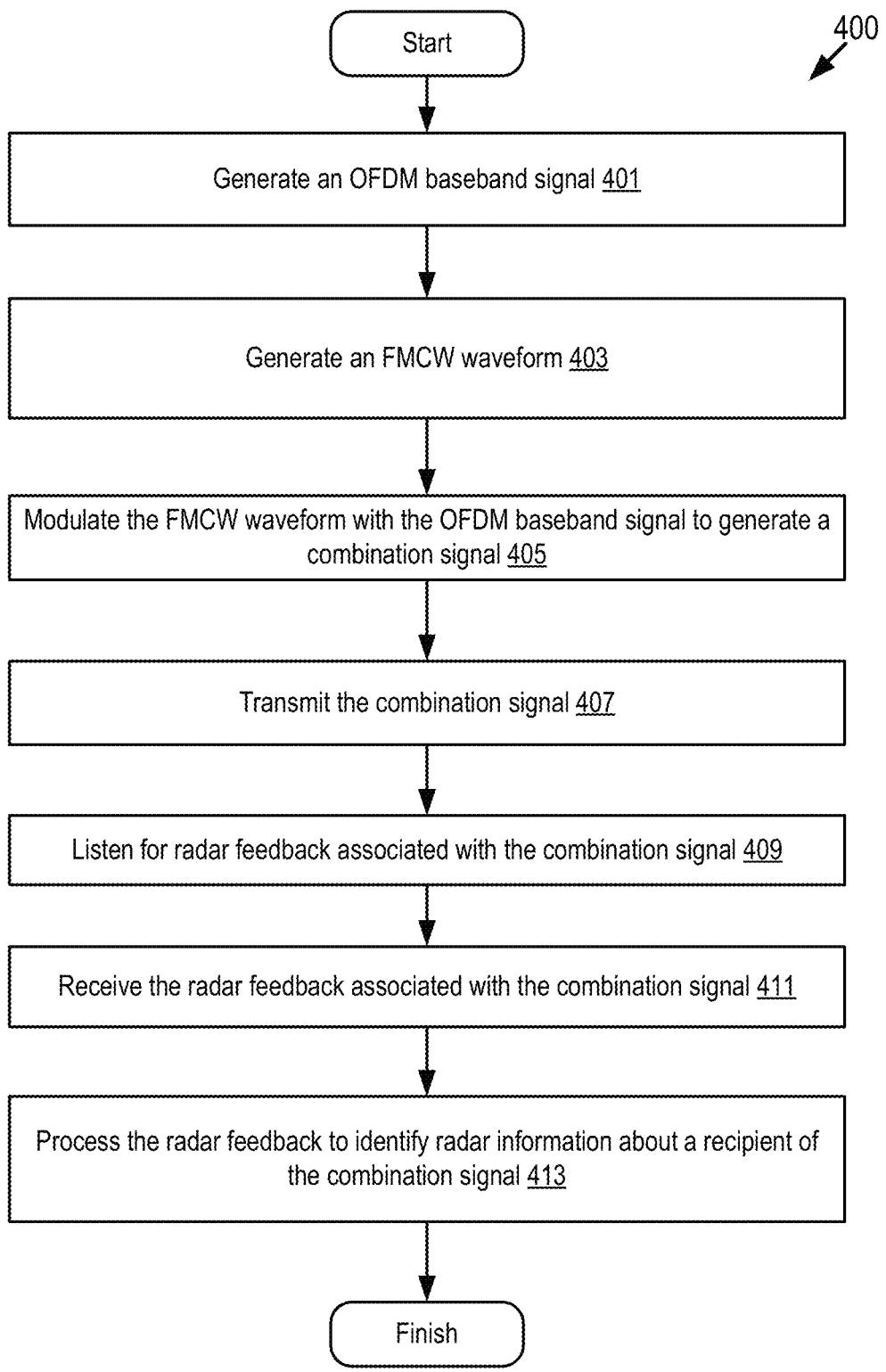
FIG. 4 depicts another method for performing integrated automotive radar processing and data communications according to some embodiments.

FIG. 4 depicts another method 400 for performing integrated automotive radar processing and data communications according to some embodiments. The steps of the method 400 are executable in any order, and not necessarily the order depicted in FIG. 4.

At step 401, the wireless-signal generation module 204 generates an OFDM baseband signal.

At step 403, the waveform generation module 206 generates an FMCW waveform.

At step 405, the combination module 208 modulates the FMCW waveform with the OFDM baseband signal to generate a combination signal.

At step 407, the combination module 208 transmits the combination signal using the transmitter 193.

At step 409, the radar processing module 210 listens for radar feedback associated with the combination signal using one or more of the receiver 194 and the radar 195.

At step 411, the radar processing module 210 receives the radar feedback associated with the combination signal.

At step 413, the radar processing module 210 processes the radar feedback to identify radar information about a recipient of the combination signal.

FIGS. 5-10 are described above with reference to FIG. 2, and similar description is not repeated here.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method for an integrated automotive radar and communication application, comprising:
   generating a wireless signal;
   generating an automotive-radar waveform;
   combining the wireless signal with the automotive-radar waveform to generate a combination signal for the integrated automotive radar and communication application so that a radar bandwidth for the automotive-radar waveform is decoupled from a communication bandwidth for the wireless signal;
   transmitting the combination signal;
   listening for radar feedback associated with the combination signal; and
   performing radar processing on the radar feedback to generate a radar detection result.

2. The method of claim 1, wherein the wireless signal includes an Orthogonal Frequency-Division Multiplexing (OFDM) baseband signal, the automotive-radar waveform includes a Frequency-Modulated Continuous-Wave (FMCW) waveform, and the combination signal includes an OFDM signal that includes a multi-carrier modulated FMCW waveform.

3. The method of claim 2, wherein the FMCW waveform has a larger bandwidth and a lower peak to average power ratio than a standard OFDM waveform.

4. The method of claim 1, wherein the radar bandwidth is increased without a need to increase the communication bandwidth.

5. The method of claim 1, wherein combining the wireless signal with the automotive-radar waveform to generate the combination signal comprises:
   modulating the automotive-radar waveform with the wireless signal to generate the combination signal.

6. The method of claim 1, wherein performing radar processing on the radar feedback to generate the radar detection result comprises:
   processing the radar feedback to identify radar information about a recipient of the combination signal, wherein the radar information includes range information and velocity information.

7. The method of claim 1, wherein performing radar processing on the radar feedback to generate the radar detection result comprises:
   performing range processing on the radar feedback to generate a preliminary range result;
   using a multi-carrier modulation to construct a matched filter to restore a beat frequency from the preliminary range result;
   determining range information based on the beat frequency; and
   performing velocity processing on the radar feedback to determine velocity information,
   wherein the radar detection result includes the range information and the velocity information.

8. The method of claim 7, wherein the range processing and the velocity processing are performed together using a two dimensional fast Fourier transform (2D-FFT) on the radar feedback so that the preliminary range result and the velocity information are generated, wherein a first dimensional FFT of the 2D-FFT corresponds to the range processing and a second dimensional FFT of the 2D-FFT corresponds to the velocity processing.

9. A system comprising:
   a processor; and
   a non-transitory memory storing computer code which, when executed by the processor,
      causes the processor to:
      generate a wireless signal;
      generate an automotive-radar waveform;
      combine the wireless signal with the automotive-radar waveform to generate a combination signal for an integrated automotive radar and communication application so that a radar bandwidth for the automotive-radar waveform is decoupled from a communication bandwidth for the wireless signal;

transmit the combination signal;
listen for radar feedback associated with the combination signal; and
perform radar processing on the radar feedback to generate a radar detection result.

10. The system of claim 9, wherein the wireless signal includes an Orthogonal Frequency-Division Multiplexing (OFDM) baseband signal, the automotive-radar waveform includes a Frequency-Modulated Continuous-Wave (FMCW) waveform, and the combination signal includes an OFDM signal that includes a multi-carrier modulated FMCW waveform.

11. The system of claim 10, wherein the FMCW waveform has a larger bandwidth and a lower peak to average power ratio than a standard OFDM waveform.

12. The system of claim 9, wherein the radar bandwidth is increased without a need to increase the communication bandwidth.

13. The system of claim 9, wherein the computer code, when executed by the processor, causes the processor to combine the wireless signal with the automotive-radar waveform to generate the combination signal at least by:
modulating the automotive-radar waveform with the wireless signal to generate the combination signal.

14. The system of claim 9, wherein the computer code, when executed by the processor, causes the processor to perform radar processing on the radar feedback at least by:
processing the radar feedback to identify radar information about a recipient of the combination signal, wherein the radar information includes range information and velocity information.

15. The system of claim 9, wherein the computer code, when executed by the processor, causes the processor to perform radar processing on the radar feedback at least by:
performing range processing on the radar feedback to generate a preliminary range result;
using a multi-carrier modulation to construct a matched filter to restore a beat frequency from the preliminary range result;
determining range information based on the beat frequency; and
performing velocity processing on the radar feedback to determine velocity information,
wherein the radar detection result includes the range information and the velocity information.

16. The system of claim 15, wherein the range processing and the velocity processing are performed together using a two dimensional fast Fourier transform (2D-FFT) on the radar feedback so that the preliminary range result and the velocity information are generated, wherein a first dimensional FFT of the 2D-FFT corresponds to the range processing and a second dimensional FFT of the 2D-FFT corresponds to the velocity processing.

17. A computer program product comprising a non-transitory memory storing computer-executable code that, when executed by a processor, causes the processor to:
generate a wireless signal;
generate an automotive-radar waveform;
combine the wireless signal with the automotive-radar waveform to generate a combination signal for an integrated automotive radar and communication application so that a radar bandwidth for the automotive-radar waveform is decoupled from a communication bandwidth for the wireless signal;
transmit the combination signal;
listen for radar feedback associated with the combination signal; and
perform radar processing on the radar feedback to generate a radar detection result.

18. The computer program product of claim 17, wherein the wireless signal includes an Orthogonal Frequency-Division Multiplexing (OFDM) baseband signal, the automotive-radar waveform includes a Frequency-Modulated Continuous-Wave (FMCW) waveform, and the combination signal includes an OFDM signal that includes a multi-carrier modulated FMCW waveform.

19. The computer program product of claim 18, wherein the FMCW waveform has a larger bandwidth and a lower peak to average power ratio than a standard OFDM waveform.

20. The computer program product of claim 17, wherein the radar bandwidth is increased without a need to increase the communication bandwidth.

* * * * *